United States Patent [19]

Caines

[11] Patent Number: 4,557,963
[45] Date of Patent: Dec. 10, 1985

[54] TAMPER-RESISTANT POLYESTER CREDIT CARDS

[75] Inventor: R. Scott Caines, Greer, S.C.
[73] Assignee: American Hoechst Corporation, Somerville, N.J.
[21] Appl. No.: 678,535
[22] Filed: Dec. 5, 1984

Related U.S. Application Data

[62] Division of Ser. No. 482,089, Apr. 4, 1983, Pat. No. 4,522,670.
[51] Int. Cl.[4] .......................... B32B 3/00; B32B 1/00; C09J 5/00; B41M 3/14
[52] U.S. Cl. ................................. 428/156; 428/174; 428/916; 283/107; 283/904; 40/616; 156/220; 264/346
[58] Field of Search ................. 40/2 R, 360, 625, 626, 40/629, 630, 616; 235/490, 380; 283/75, 94, 107, 90, 82, 91, 904; 428/916, 915, 480, 481, 482, 483, 156, 174; 101/17

[56] References Cited

U.S. PATENT DOCUMENTS

| | | | |
|---|---|---|---|
| 3,313,052 | 4/1967 | Malster | 283/90 |
| 3,880,706 | 4/1975 | Williams | 427/7 |
| 4,098,940 | 7/1978 | Groh et al. | 40/2.2 |
| 4,133,926 | 1/1979 | Vorrier et al. | 40/2.2 |
| 4,214,035 | 7/1980 | Heberaer . | |
| 4,252,885 | 2/1981 | McGrail et al. . | |
| 4,304,809 | 12/1981 | Moraw et al. | 428/916 |
| 4,304,851 | 12/1981 | McGrail et al. . | |
| 4,325,196 | 4/1982 | Gauch et al. | 40/2.2 |
| 4,343,851 | 8/1982 | Sheptak | 40/2.2 |
| 4,389,472 | 6/1983 | Neuhaus et al. | 428/916 |
| 4,434,199 | 2/1984 | Fair | 428/156 |
| 4,451,068 | 5/1984 | Hall et al. | 283/904 |
| 4,455,484 | 6/1984 | Whitehead | 235/493 |
| 4,456,639 | 6/1984 | Drower et al. | 428/916 |

FOREIGN PATENT DOCUMENTS 1078813 8/1967 United Kingdom .

OTHER PUBLICATIONS

Assault with a Plastic Weapon (Credit Card Fraud) by M. Wantuck, Nation's Business, May 1984, pp. 20–24.

Primary Examiner—Edward Kimlin
Assistant Examiner—Louis Falasco
Attorney, Agent, or Firm—James C. Lydon; Michael J. Tully; James R. Cartiglia

[57] ABSTRACT

The present invention relates to a credit card or identification card fabricated from amorphous polyester sheet material wherein at least the area of said card containing embossed numerical or letter characters and the characters themselves are composed of substantially crystalline polyester. Such characters can not readily be altered by either heat treatment or by shaving them off.

2 Claims, 2 Drawing Figures

TAMPER-RESISTANT POLYESTER CREDIT CARDS

This is a division of application Ser. No. 06/482,089, filed on Apr. 4, 1983 now U.S. Pat. No. 4,522,670.

BACKGROUND OF THE INVENTION

The fraudulent use of credit cards is becoming more prevalent every year. Credit card blanks are most commonly fabricated from plastic material and comprise a core sheet, usually polyvinyl chloride or copolymers thereof, upon which certain information concerning the issuer of the credit card is printed. The printed core may be overlayed with a vinyl film on one or both sides and the film is heat laminated to the core stock. Adhesives are commonly used to provide for firmer bonding of the core stock to the overlay. An example of such a laminated structure is set forth in U.S. Pat. No. 4,133,926.

It is also known to provide identification cards which have been specifically devised to be resistant to counterfeiting. One such structure comprises a laminate of a polyester film layer laminated to a uniaxially oriented plastic by means of an adhesive layer, as disclosed in U.S. Pat. No. 4,343,851. Other such identification cards are disclosed in U.S. Pat. No. 4,325,196.

As is well known, credit cards also contain embossed characters identifying the name and account number of the credit card holder. These characters are offset and raised such that the information may be transferred to charge slips. In conventional practice, printing is applied directly to the plastic core sheet, while embossing is effected after the core sheet has been laminated between the vinyl films.

Unfortunately, the embossed characters on lost or stolen credit cards made from the conventional thermoplastic materials can be easily altered. One or more of the embossed characters can be shaved off the surface of the card and a different character pasted on. Thus two digits of an account number can be transposed giving an entirely different number. Embossed names can be altered or shortened using the same technique.

Still another technique for altering credit card characters is to simply iron them out. Thermoplastic material can be made to flow by the application of pressure and sufficient heat thereby removing the embossed characters. New characters may then be embossed by simply stamping them at the appropriate location on the card.

If these and similar alteration techniques are done carefully enough, it may be very difficult to differentiate between an altered card and an original.

Accordingly, it is an object of this invention to provide a plastic credit card having embossed characters which can not readily be altered or removed.

Yet another object is to provide a plastic credit card which can not readily be re-embossed with altered characters.

SUMMARY OF THE INVENTION

These and other objects may be achieved by the utilization of substantially amorphous polyester sheet material as core sheet in the fabrication of credit card blanks and by embossing such sheet material or blanks with the desired characters followed by the application of sufficient heat or other means to substantially crystallize the amorphous polyester core sheet at least in that area where the embossed characters are formed. In the resulting article and because of the properties of crystalline polyester, the embossed characters can not be easily shaved off without destroying the shape of the character itself. If one attempts to iron the characters out, there remains a "plastic memory" of the characters as originally embossed such that significant evidence of the original characters is discernible on the surface of the article. In addition, it becomes difficult to re-emboss new numbers on the now-crystalline polyester core sheet surface.

Actually, any attempt to heat alter the crystalline polyester portions of the article would require temperatures so high (in excess of 450° F.) that the article could be distorted or disfigured, thereby making it more obvious that an attempt had been made to alter the article.

Figure 1:
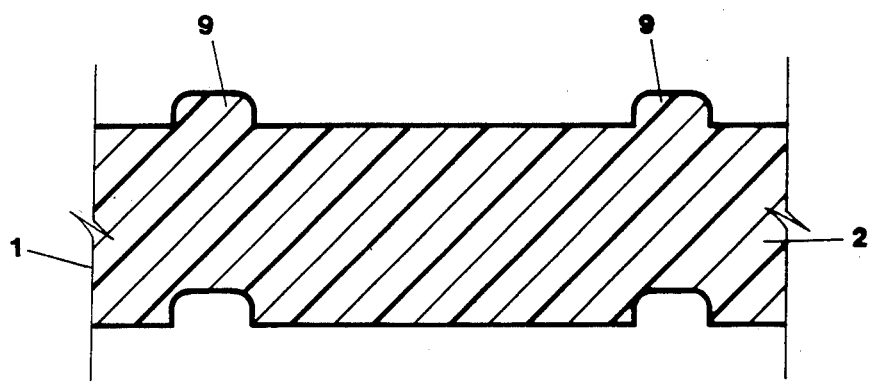
Referring to FIG. 1, there is illustrated a schematic sectional view of a credit card structure 1 comprising a sheet 2 of polyester. The sheet has been embossed to produce offset characters 9.
Figure 2:
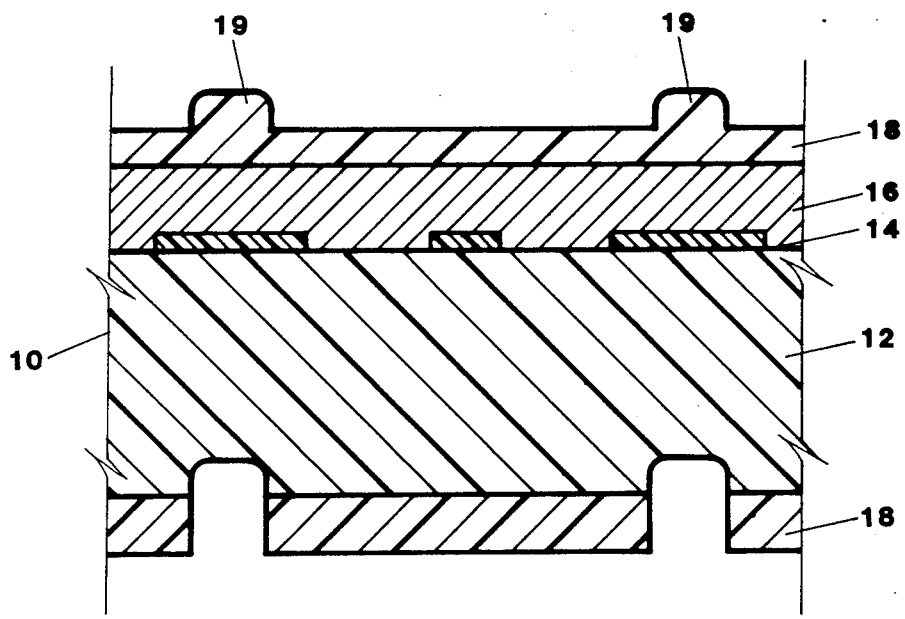
FIG. 2 depicts a schematic sectional view of a laminated structure such as a credit card identified by reference numeral 10.

The structure includes a core sheet 12 formed of polyester sheet. The upper surface of the illustrated sheet is partially covered with printing ink 14. Outer overlay films 18 are laminated to both surfaces of the polyester sheet. Layer 16 represents the dry residue of an adhesive used to improve the adhesion between film 18 and sheet 12. The sheet has been embossed to produce offset characters 19. In each of these drawings the thickness of the card structure has been exaggerated for the purposes of clarity. In practice, the height and depth of the male/female embossments 9 and 19 would be about the same as the thickness of the card structure.

DETAILED DESCRIPTION OF THE INVENTION

Amorphous polyester core sheet material useful for the purposes of this invention may be formed from any of the well known thermoplastic heat crystallizable polyesters produced by condensing an aromatic dicarboxylic acid or a lower alkyl diester thereof with a glycol. Among such dicarboxylic acids are included terephthalic acid and copolymers thereof with minor amounts of isophthalic; phthalic; succinic; sebacic; adipic; azelaic; bibenzoic or like acids. One or more of these acids or acid esters is reacted with one or more glycols which include ethylene glycol; 1,3-propanediol; 1,4-butanediol; neopentyl glycol or 1,4-cyclohexanedimethanol. The preferred film forming polyester useful for the purposes of this invention is polyethylene terephthalate.

The amorphous polyester sheet may be formed by heating the polyester to a temperature above its melting point and continuously melt extruding the material in sheet form through a slot die onto a chilled casting drum after which it solidifies into a substantially amorphous sheet. The amorphous sheet may be then cooled and rolled. The preferred thickness of the amorphous sheet for credit card applications is in the range of about 5 to 40 mils, so the extrusion die slit opening should be gauged to provide sheet within such range of thickness.

The core sheet material may be overlayed on one or both surfaces with a thinner gauge film material which serves to both protect matter printed on the core sheet and to give the article a better appearance. Virtually any plastic film material which can be laminated with good adhesion to the amorphous polyester core sheet can be employed, e.g., polyvinyl chloride film, but it is preferred to utilize mono or bi-axially oriented polyester film for this purpose. Such polyester film may be prepared from the same monomers as set forth above with respect to the core sheet and the oriented film is manufactured as is known in the art by stretching the film in one or two mutually perpendicular directions, as for example as set forth in U.S. Pat. No. 4,214,035. The preferred film is biaxially oriented crystalline polyethylene terephthalate film having a preferred thickness in the range of about 0.25 to 2 mils, more preferably about 1 mil. The use of the overlay film is optional, but preferred.

In many cases it may be desirable or necessary to utilize an adhesive material to improve the laminate adhesion between the polyester core sheet and the polyester overlay. This is particularly important where the core sheet has been printed with wet or dry lithographic offset inks or screen printing inks, since the ink will tend to interfere with good lamination. Adhesive materials which can be used include acrylic or methacrylic resins, ethylene/vinyl acetate copolymers, water dispersible copolyesters containing at least one free functional acid group in the polymer chain such as disclosed in U.S. Pat. Nos. 4,252,885 and 4,304,851, incorporated herein by reference, and heat sealable coating polymers such as disclosed in British patent No. 1,078,813. The adhesive may be applied either to the surface of the polyester core sheet or to the surface of the overlay film prior to lamination.

Preferably the adhesive material is applied to the surface of the overlay film either during or after its manufacture and the core sheet material may then be laminated to the coated surface of one layer, or between the coated surfaces of two layers, of the overlay film. Lamination may be accomplished using a heat press having highly polished metal surfaces. The thickness of the adhesive layer on the oriented polyester film is preferably within the range of about $10^{-7}$ to $2 \times 10^{-4}$ inch.

The amorphous core sheet and/or protective film used in the present invention may contain conventional additives as known in the art including filler materials, such as silica, talc, calcium chloride, or clay and/or colorants, such as titanium dioxide, as well as other pigments.

Credit card blanks are generally fabricated by printing with adherable inks on the core sheet material the desired commercial information, such as by screen or offset methods, and subsequently laminating thereto under heat and pressure an overlay film on one or both sides. The composite is then embossed under pressure and in some cases heat with numerical and/or letter characters, either before or after which said composite is cut into credit card size.

In its broader aspect, credit cards of this invention may be prepared by (1) providing a supply of amorphous polyester sheet; (2) embossing said sheet (either before or after cutting said sheet into the appropriate size for a credit card) under pressure and optionally heat to form offset characters on the card; (3) heating said card for a time and at a temperature sufficient to crystallize the amorphous polyester, or at least that portion of the card bearing offset characters while preferably maintaining said card under restraint to prevent any curling or distortion of the card; and (4) cooling said card to ambient conditions.

Credit cards of this invention are also prepared by: (1) providing a supply of amorphous polyester sheet, commercially printed using a polyester screen ink adherable to the polyester surface; (2) providing a supply of overlay film, optionally coated on at least one side with an adhesive for enhancing the lamination bond between said overlay film, said ink and the printed surface of said polyester sheet; (3) laminating by heat and pressure the overlay film to both sides of the polyester sheet for a time and at a temperature sufficient to provide good laminar adhesion, but insufficient to cause substantial crystallization of the amorphous sheet, to provide a composite with a tough durable overlay; (4) cutting the composite into the right size and shape for a credit card, i.e., about 3¼ to 3½ inch by 2 to 2¼ inch; (5) embossing said card under pressure, and optionally heat, with numerical and/or letter characters using an appropriate device such as an offset press or label maker to form offset characters on the card; (6) heating said card for a time and at a temperature sufficient to crystallize the amorphous polyester card, or at least that portion of the card containing the offset characters while preferably restraining said card to prevent any curling or distortion thereof, and (7) cooling the card to ambient conditions.

In the embodiments referred to above, the temperature required to achieve partial or total crystallization of the amorphous polyester sheet or card may vary as a function of time in that crystallization is both time and temperature dependent. Generally, temperatures in the range of 90° C. to 240° C. may be employed, with the maximum rate of crystallization occurring at about 165° C. At any given temperature, the time required for crystallization will be evident by observation and evaluation of the change in properties of the polyester. Any source of energy which will provide sufficient heat to crystallize the amorphous polyester or portion thereof bearing the offset characters may be used. This would include infrared and microwave sources.

In the preferred embodiment where the amorphous polyester sheet is laminated to one or two overlay films, the temperature required to achieve good adhesive bonding will vary depending on the properties of the overlay film and whether or not an adhesive layer is present and the nature of the printing ink present on the surface of the amorphous polyester sheet. Temperatures sufficient to soften the adhesive layer are required, and the pressure must be sufficient to form a good firm bond between the layers, i.e., greater than about 25 psi. Temperature, pressure and time conditions must, however, not be such that any substantial crystallization of the amorphous polyester sheet is permitted to occur.

The following examples are illustrative of the invention:

EXAMPLE 1

Two strips of biaxially oriented polyethylene terephthalate film having a thickness of about 0.48 mil were laminated to both sides of a strip of a cast sheet of amorphous polyethylene terephthalate having a thickness of about 7 mils. Lamination was accomplished using a gradient bar sealer at a temperature of about 300° F., a pressure of 80 psi and for a period of about six seconds. The resulting composite was then embossed at room temperature with various numerical and letter characters using a Dymo ® label maker. The resulting embossed composite was mounted in a frame restraint to prevent heat distortion and then heated in a convection oven at 125° C. for a period of 10 minutes to crystallize the amorphous core sheet.

EXAMPLE 2

A strip of cast amorphous polyethylene terephthalate film having a thickness of 6.9 mils was placed in a letter vise and embossed at room temperature with lettering by closing the vise. The vise containing the restrained film was placed in a convection oven at 125° C. for about 10 minutes to crystallize the polyester. After 10 minutes the assembly was removed from the oven and allowed to cool to room temperature before opening the vise.

EXAMPLE 3

The procedure of Example 1 was repeated except that the strips of biaxially oriented polyethylene terephthalate film were coated with an aqueous adhesive layer comprising a copolyester having free sulfo acid groups in the polymer chain and dried. The strips were laminated to the core using this adhesive layer to promote adhesion.

The strips prepared according to Examples 1 and 2 were evaluated for their resistance to tampering in comparison with two control samples. Control A was a 10.7 mil thick strip of unplasticized polyvinyl chloride sheeting; Control B was a 7.0 mil thick strip of biaxially oriented (crystallized) polyethylene terephthalate sheeting. Each of these materials were embossed at room temperature with various numerical and letter characters by the method set forth in Example 1.

The resistance of the embossments in each sample to "ironing out" was evaluated using a laboratory gradient heat sealer set at 300° F. The heat sealer was applied to the embossed strips at a pressure of 50 psi for a period of six seconds.

The resistance of the embossments to "shaving" was evaluated by attempting to shave them off the surface of the sheet using an ordinary razor blade.

Results are recorded in the Table.

TABLE

| | Ironing Out | Shaving |
| --- | --- | --- |
| Ex 1 | Some flattening, but obvious evidence of the embossments is apparent. | Embossments could not easily be removed. |
| Ex 2 | Some flattening, but obvious evidence of the embossments is apparent. | Embossments could not easily be removed. |
| Control A | Severe flattening but faint evidence of the embossment. | Characters could be easily cut from sheet without destruction of their shape. |
| Control B | Embossment was flat due primarily to the initial resistance to embossing of crystalline polyester. | Characters were not high enough to be effectively removed by a razor blade. |

From the above it can be concluded that credit cards prepared by embossing polyester sheet material in the amorphous state followed by crystallization of the embossed sheet produces a credit card having a superior resistance to tampering.

What I claim is:

1. A credit card blank produced according to a method of preparing a credit or identification card comprising: (a) providing a supply of substantially amorphous polyester sheet material; (b) embossing a surface of said sheet material under pressure with numerical and/or letter characters; (c) holding said sheet material under restraint while heating said sheet material to a temperature and for a time sufficient to substantially crystallize at least the embossed portion of said amorphous polyester sheet; and (d) cooling said sheet material.

2. A credit card blank produced according to a method of preparing a credit or identification card comprising: (a) providing a supply of substantially amorphous polyester sheet material; (b) providing a supply of overlay film; (c) laminating said overlay film to one or both sides of said sheet material under heat and pressure insufficient to substantially crystallize said amorphous polyester sheet to provide a composite sheet; (d) embossing a portion of a surface of said composite sheet under pressure with numerical and/or letter characters; (e) holding said composite sheet under restraint while heating said composite sheet to a temperature and for a time sufficient to substantially crystallize at least the embossed portion of said amorphous polyester sheet; and (f) cooling said sheet material.

* * * * *